United States Patent
Haider

(10) Patent No.: US 12,433,571 B2
(45) Date of Patent: Oct. 7, 2025

(54) DUAL BIAS MICROMACHINED ULTRASONIC TRANSDUCERS

(71) Applicant: GE Precision Healthcare LLC, Wauwatosa, WI (US)

(72) Inventor: Bruno Haider, Rehoboth Beach, DE (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 136 days.

(21) Appl. No.: 18/332,292

(22) Filed: Jun. 9, 2023

(65) Prior Publication Data

US 2024/0407758 A1    Dec. 12, 2024

(51) Int. Cl.
*A61B 8/00*    (2006.01)
*B06B 1/02*    (2006.01)

(52) U.S. Cl.
CPC .......... *A61B 8/4494* (2013.01); *A61B 8/4444* (2013.01); *B06B 1/0276* (2013.01); *B06B 2201/51* (2013.01); *B06B 2201/55* (2013.01); *B06B 2201/76* (2013.01)

(58) Field of Classification Search
CPC ... A61B 8/4444; A61B 8/4494; B06B 1/0276; B06B 2201/51; B06B 2201/55; B06B 2201/76
See application file for complete search history.

(56) References Cited

U.S. PATENT DOCUMENTS

2017/0360415 A1\* 12/2017 Rothberg ............. A61B 8/4477
2022/0386997 A1\* 12/2022 Igarashi ............... A61B 8/4444

OTHER PUBLICATIONS

Wu, L. et al., "Dual-frequency piezoelectric micromachined ultrasonic transducers," Applied Physics Letters, vol. 115, No. 2, Jul. 8, 2019, 6 pages.

\* cited by examiner

*Primary Examiner* — Michael T Rozanski
(74) *Attorney, Agent, or Firm* — McCoy Russell LLP

(57) ABSTRACT

Methods and systems are provided for an ultrasound probe including a piezoelectric micromachined ultrasonic transducer including a first top electrode, a second top electrode, and a bottom electrode. The ultrasound probe further includes a transmitter/receiver configured to apply a single drive signal to the bottom electrode and a bias circuit configured to apply a first voltage bias to the first top electrode and to apply a second voltage bias to the second top electrode.

18 Claims, 10 Drawing Sheets

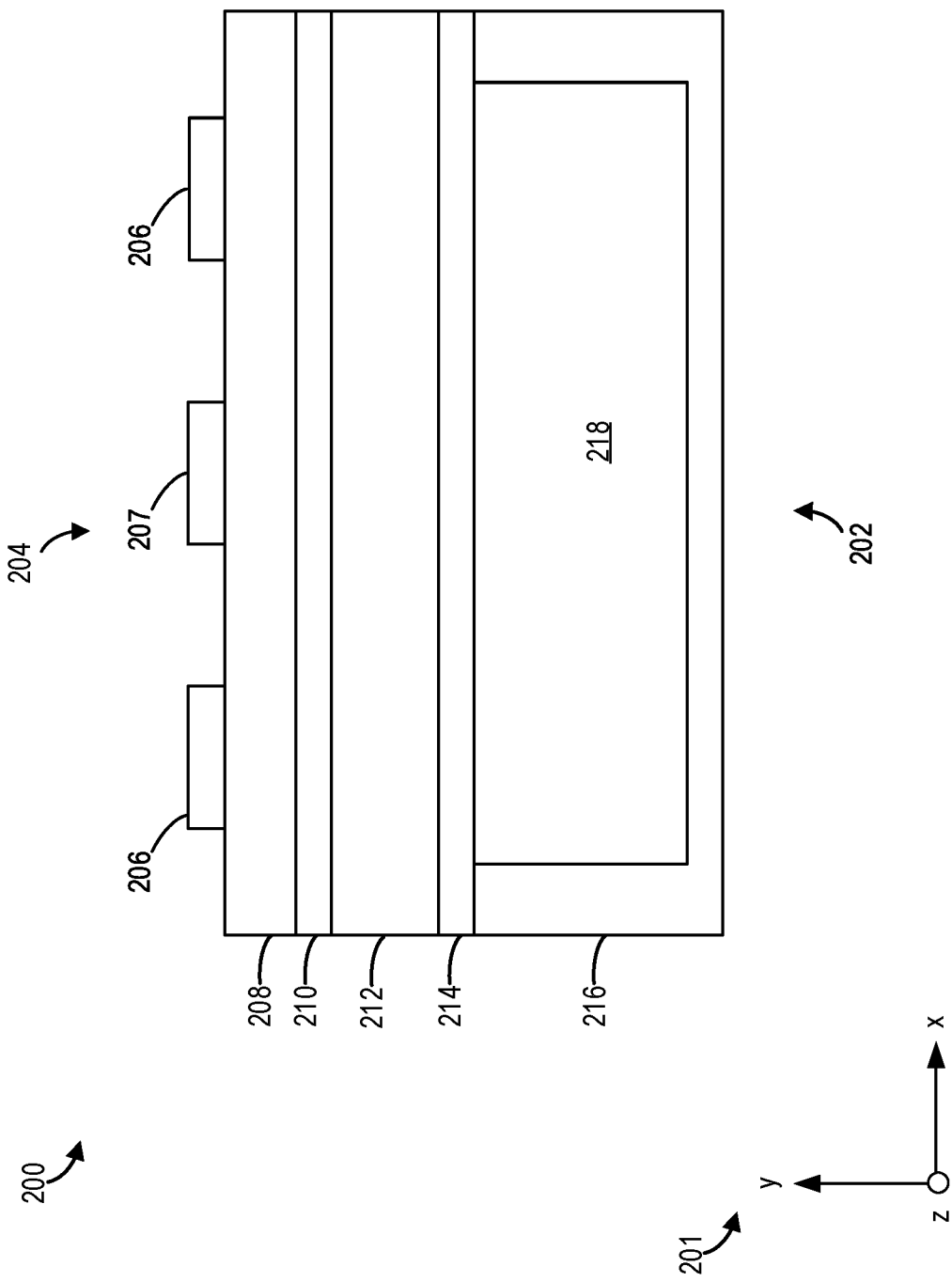

DUAL BIAS MICROMACHINED ULTRASONIC TRANSDUCERS

TECHNICAL FIELD

Embodiments of the subject matter disclosed herein relate to microelectromechanical systems (MEMS) devices and, in particular, micromachined ultrasonic transducers.

BACKGROUND

A microelectromechanical systems (MEMS) ultrasound device (hereafter, MEMS device) may be used for imaging and/or therapy targets such as organs and soft tissues in a human body, as well non-human targets. For example, the MEMS device may be used for applications such as ultrasound/acoustic sensing, non-destructive evaluation (NDE), ultrasound therapy (e.g., High Intensity Focused Ultrasound (HIFU)), etc., in addition to ultrasound imaging of humans, animals, etc. The MEMS device may rely on vibration of a membrane with a first electrode to receive and transmit signals.

MEMS devices may use real time, non-invasive high frequency (e.g., in a range of 100 KHz to tens of MHz) sound waves to produce a series of two-dimensional (2D) and/or three-dimensional (3D) images. The sound waves may be transmitted by a transmit transducer, and the reflections of the transmitted sound waves may be received by a receive transducer. The received sound waves may then be processed to display an image of the target. Some types of MEMS devices may be used as a transmit transducer and/or a receive transducer, such as a micromachined ultrasonic transducer (MUT). A MUT may be a capacitive micromachined ultrasonic transducer (CMUT) or a piezoelectric micromachined ultrasonic transducer (PMUT). The CMUT may include a top electrode coupled to a membrane and a bottom electrode. The membrane may move upon receiving electrical signals to generate sound waves or may move upon receiving sound waves to generate electrical signals that can be processed. The PMUT may include a thin layer of piezoelectric material. The piezoelectric material may compress/expand (e.g., vibrate or deflect) to generate a sound wave in response to an applied electric field, and may in turn generate an electric field in response to being vibrated by a sound wave.

BRIEF DESCRIPTION

In one embodiment, an ultrasound probe comprises a piezo electric micromachined ultrasonic transducer (PMUT) including a first top electrode, second top electrode, and a bottom electrode; a transmitter/receiver configured to apply a single drive signal to the bottom electrode; and a bias circuit configured to apply a first voltage bias to the first top electrode and to apply a second voltage bias to the second top electrode. In one example, the voltage applied across a piezo layer of a PMUT at the first top electrode and at the second top electrode may polarize the in opposite directions. The opposite polarization directions may result in opposite deflection of a piezo layer when a single drive signal is applied. In this way, a bandwidth of the PMUT may be increased without demanding two different drive signals. Increasing the bandwidth may make MUT transducers of greater use in applications that demand higher resolution, such as medical ultrasound.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, herein below:

FIG. 2A shows an exemplary cross sectional view of a PMUT in accordance with various embodiments.

DETAILED DESCRIPTION

Figure 1:
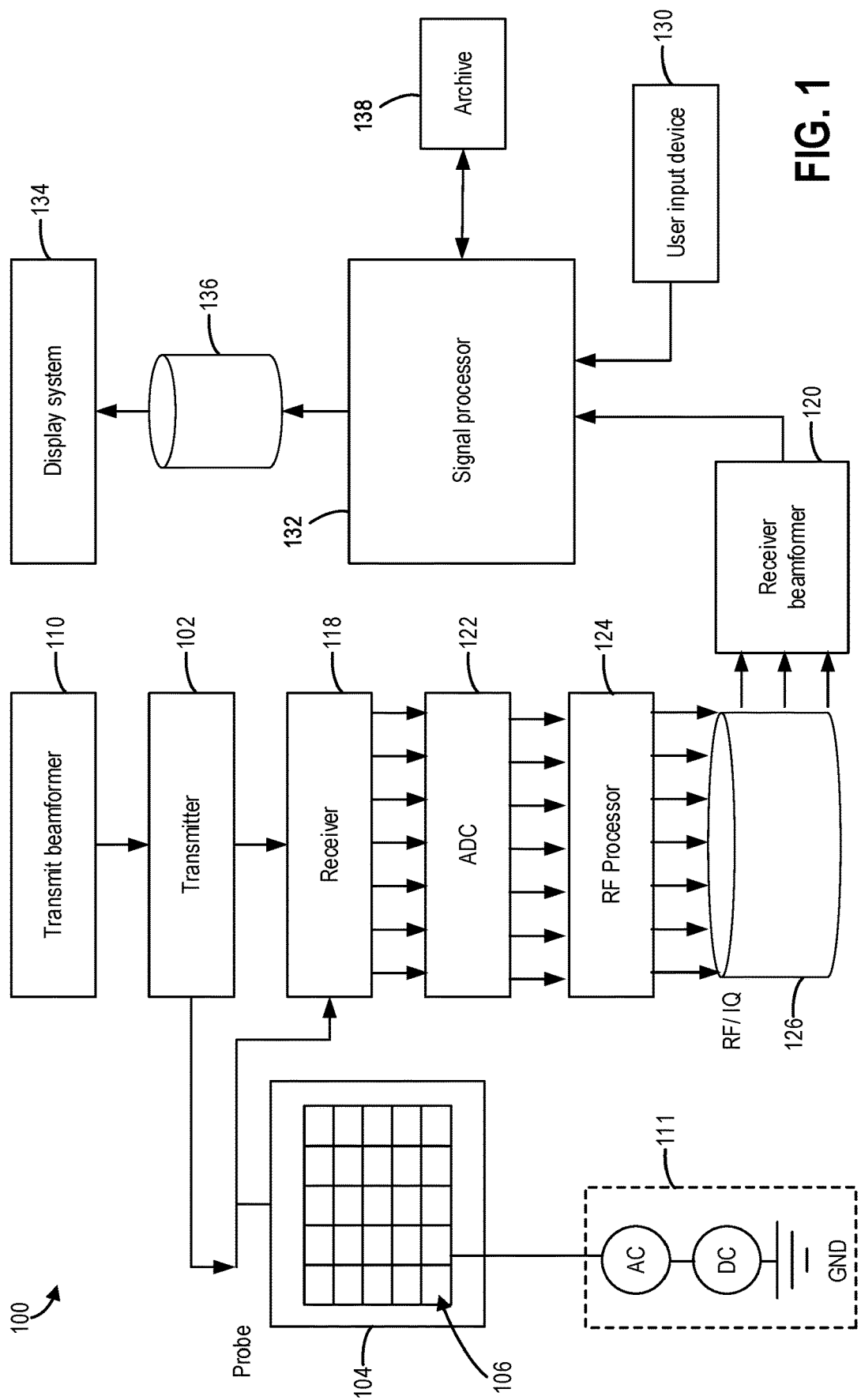
FIG. 1 shows a block diagram of an exemplary ultrasound system that may be used in ultrasound imaging, in accordance with various embodiments.

The following description relates to systems and methods for driving micromachined ultrasound transducers (MUTs). A MUT may be part of an ultrasound system as shown in FIG. 1. In some examples, MUTs may be either capacitive (CMUT) or piezoelectric (PMUT). MUT devices may have limited signal bandwidth, leading to poor image quality. One approach to broaden the bandwidth has been to pattern a MUT with two separate top electrodes and actuate (e.g., drive) the MUT with two different drive signals, one applied to each of the two top electrodes. The two different drive signals may actuate different resonant frequencies under each of the two top electrodes. However, the two different drive signals may demand two transmitters and two receivers coupled to each transducer element of an ultrasound probe. When the ultrasound probe may include a transducer array comprising up to thousands of transducers, doubling a number of transmitters and receivers for each transducer may not be feasible from both a cost and form factor standpoint.

Figure 2B:
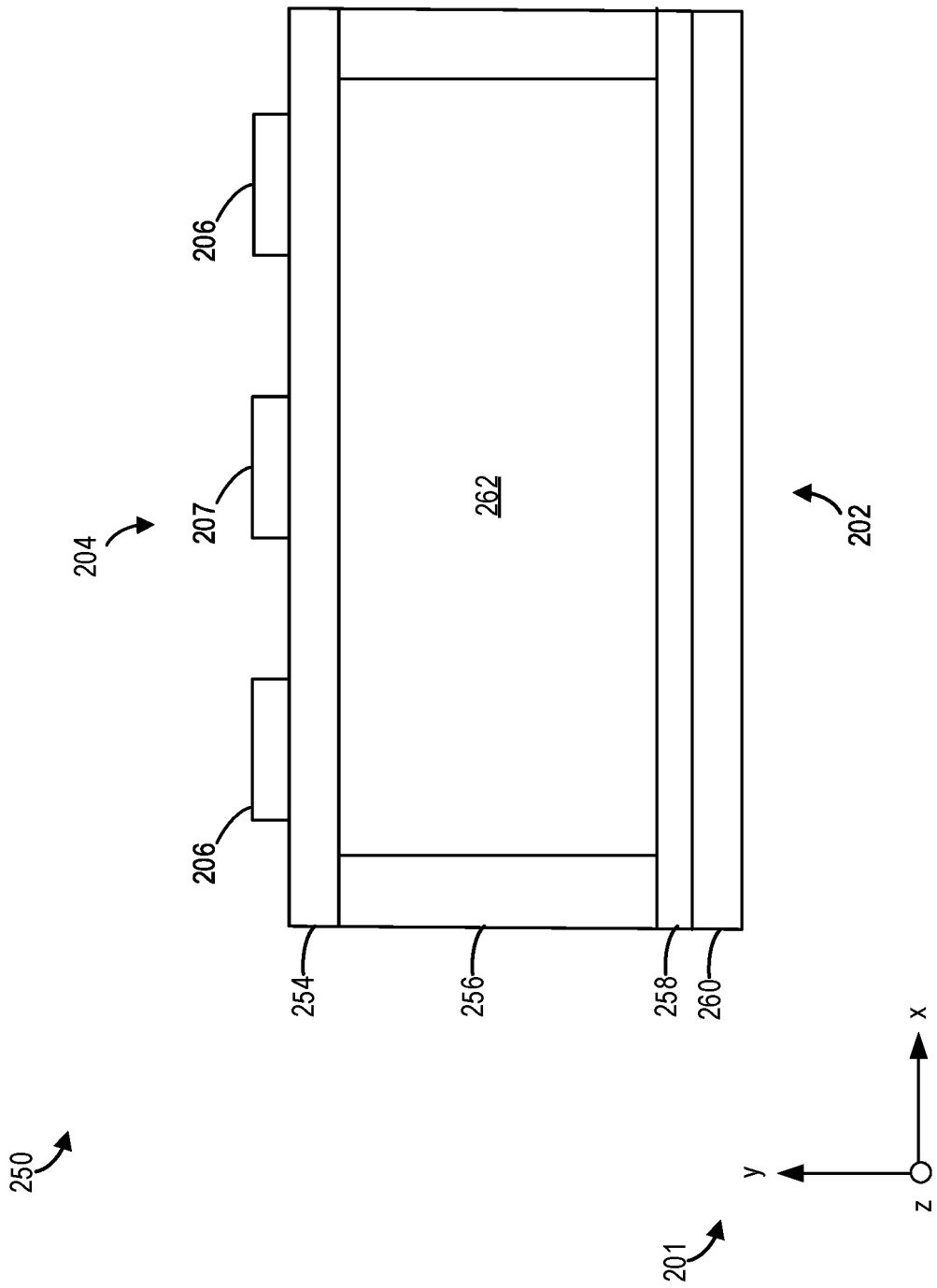
FIG. 2B shows an exemplary cross sectional view of a CMUT in accordance with various embodiments.
Figure 2C:
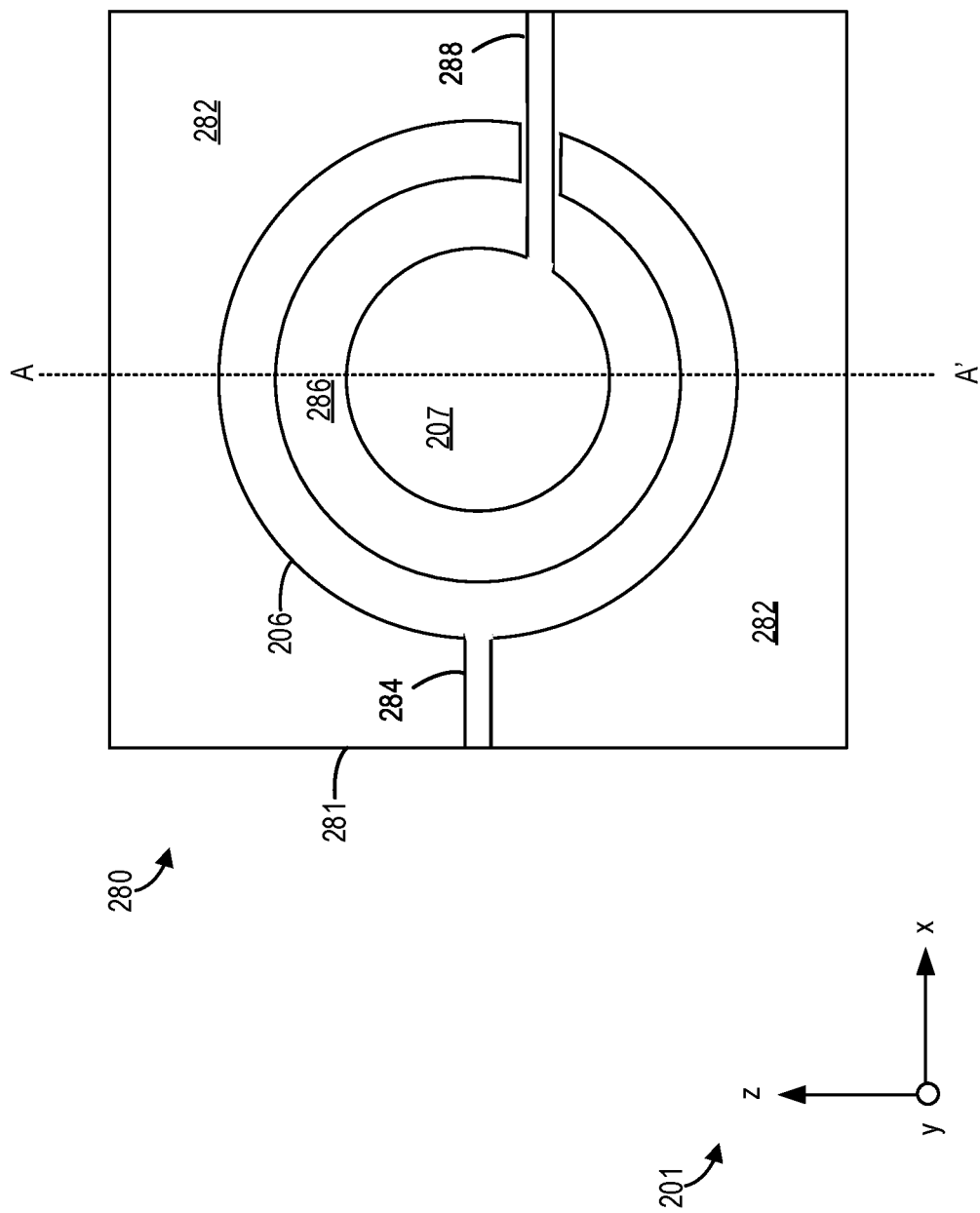
FIG. 2C shows an exemplary top view of a MUT in accordance with various embodiments.
Figure 3A:
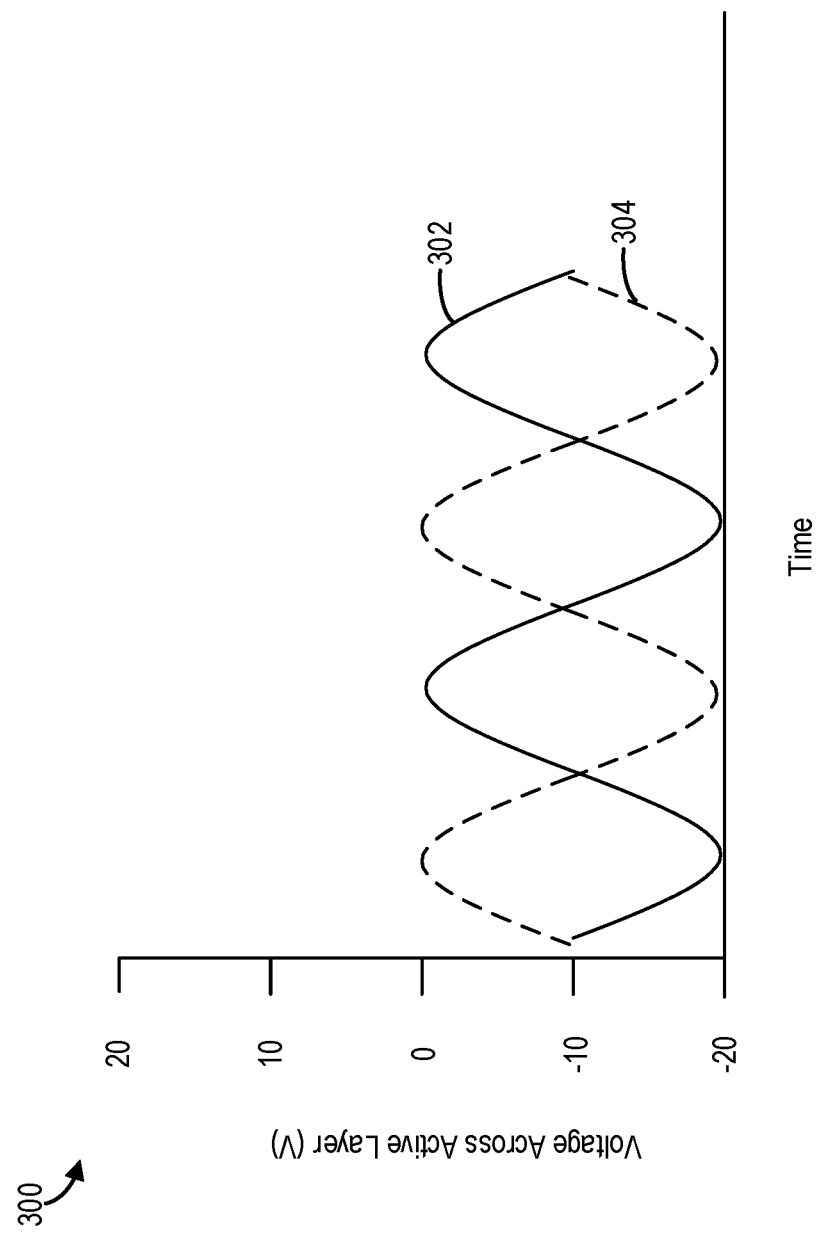
FIG. 3A shows a graph of an example of two drive signals with a common voltage bias, as prior art.
Figure 3B:
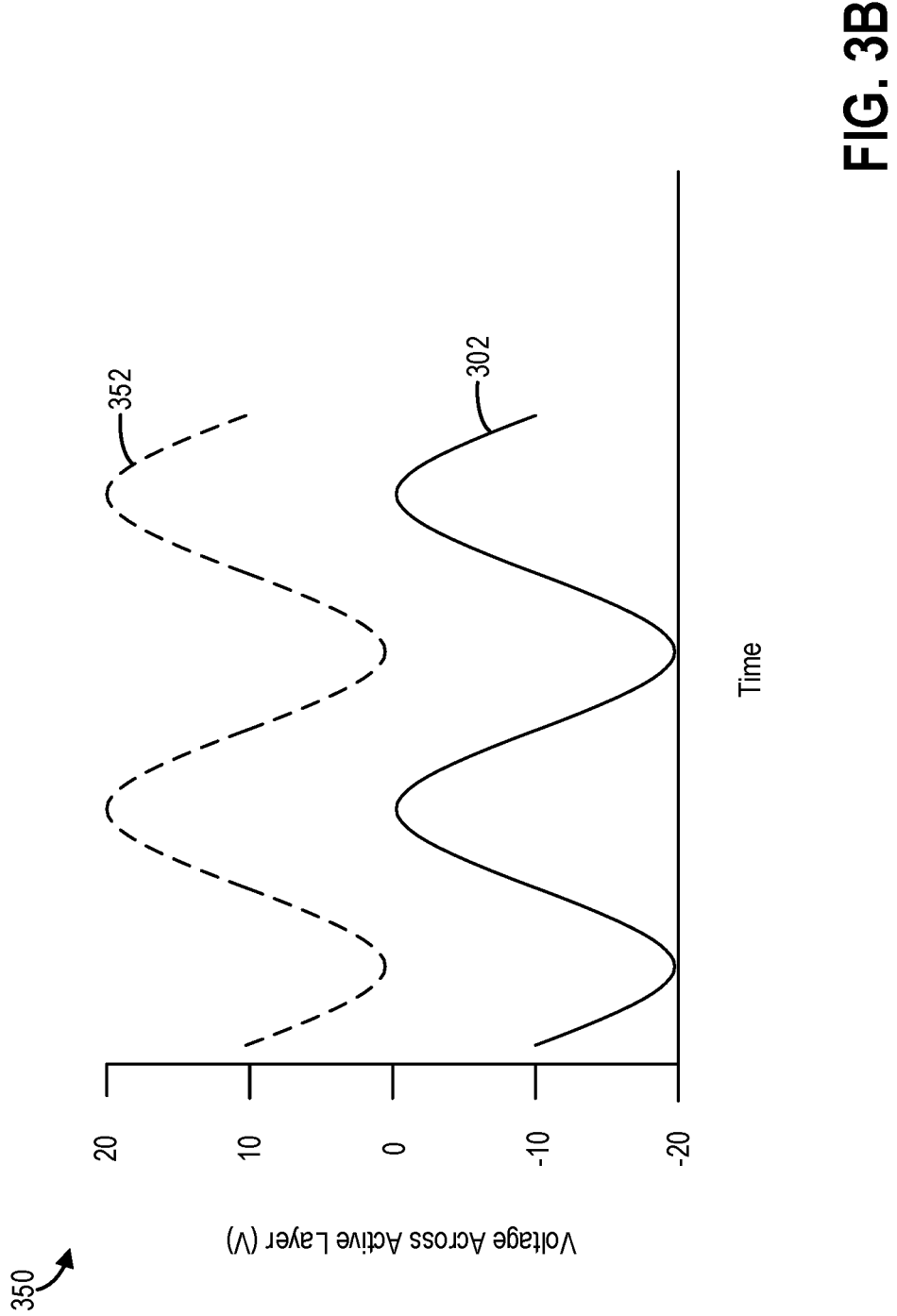
FIG. 3B shows a graph of an example of a single drive signal with dual bias voltages in accordance with various embodiments.
Figure 4:
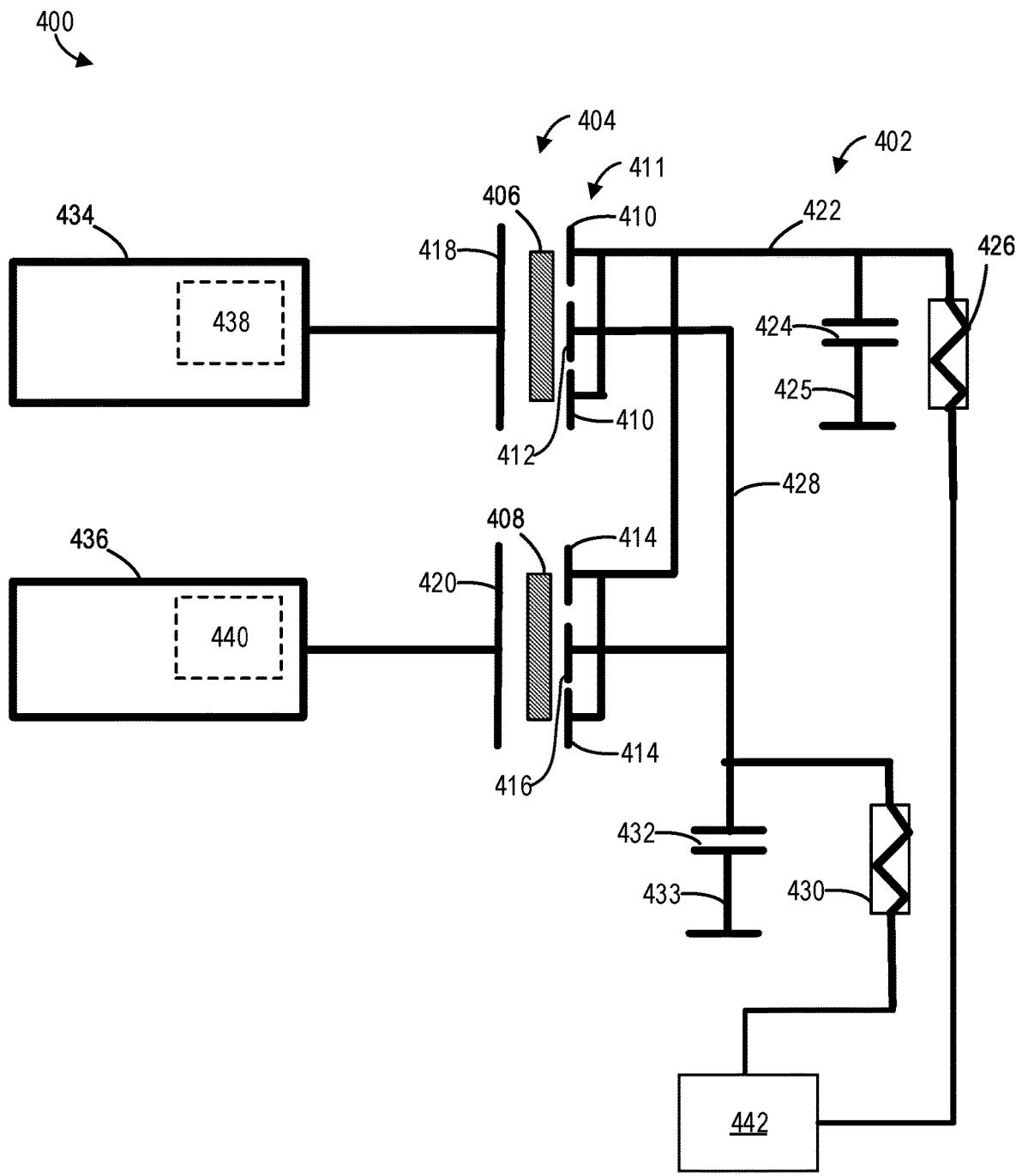
FIG. 4 shows a schematic diagram of a drive circuit capable of delivering dual bias voltages, in accordance with various embodiments.
Figure 5:
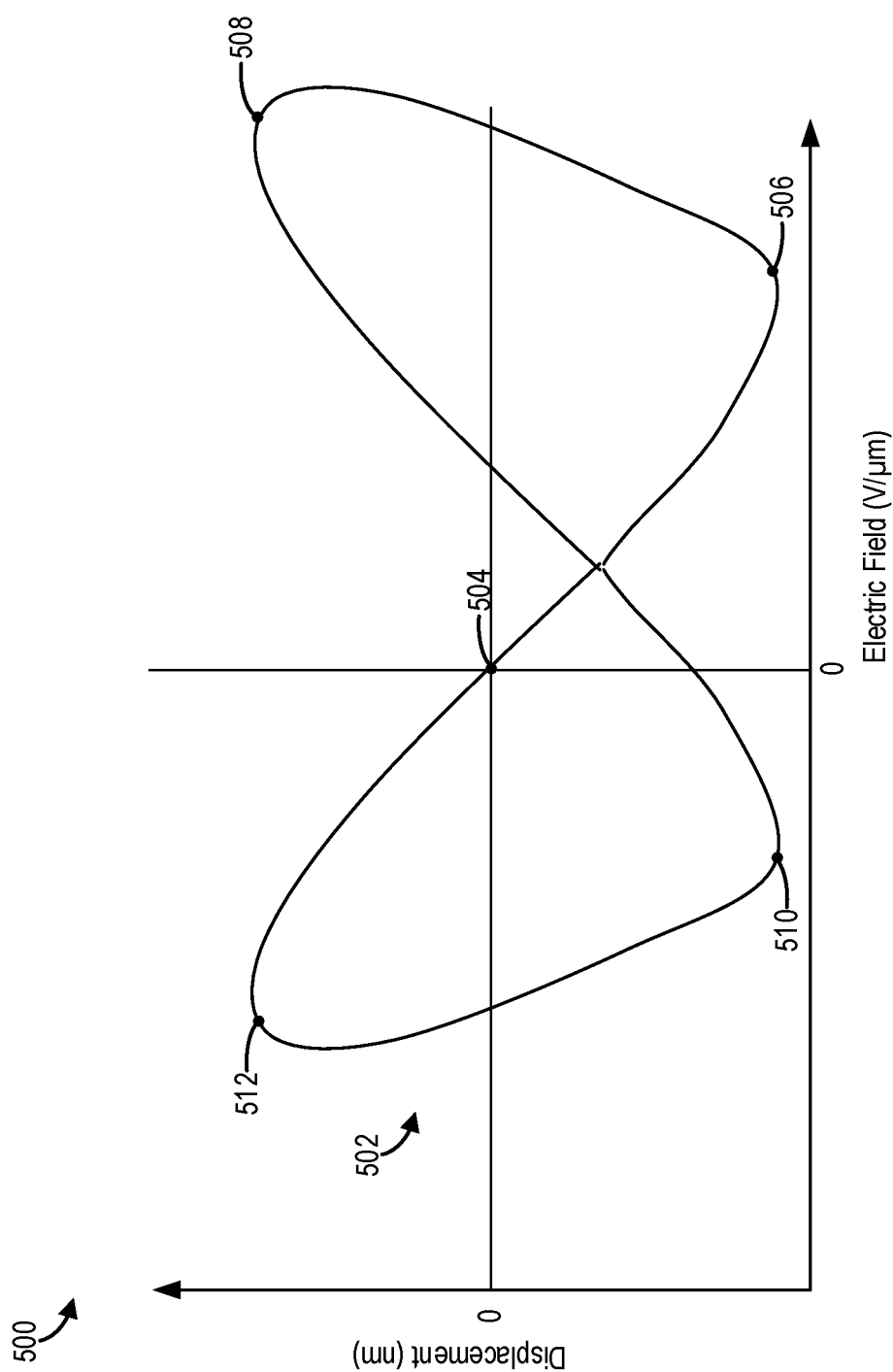
FIG. 5 shows graph of displacement as a function of an electric field for a piezo transducer, in accordance with various embodiments.
Figure 6:
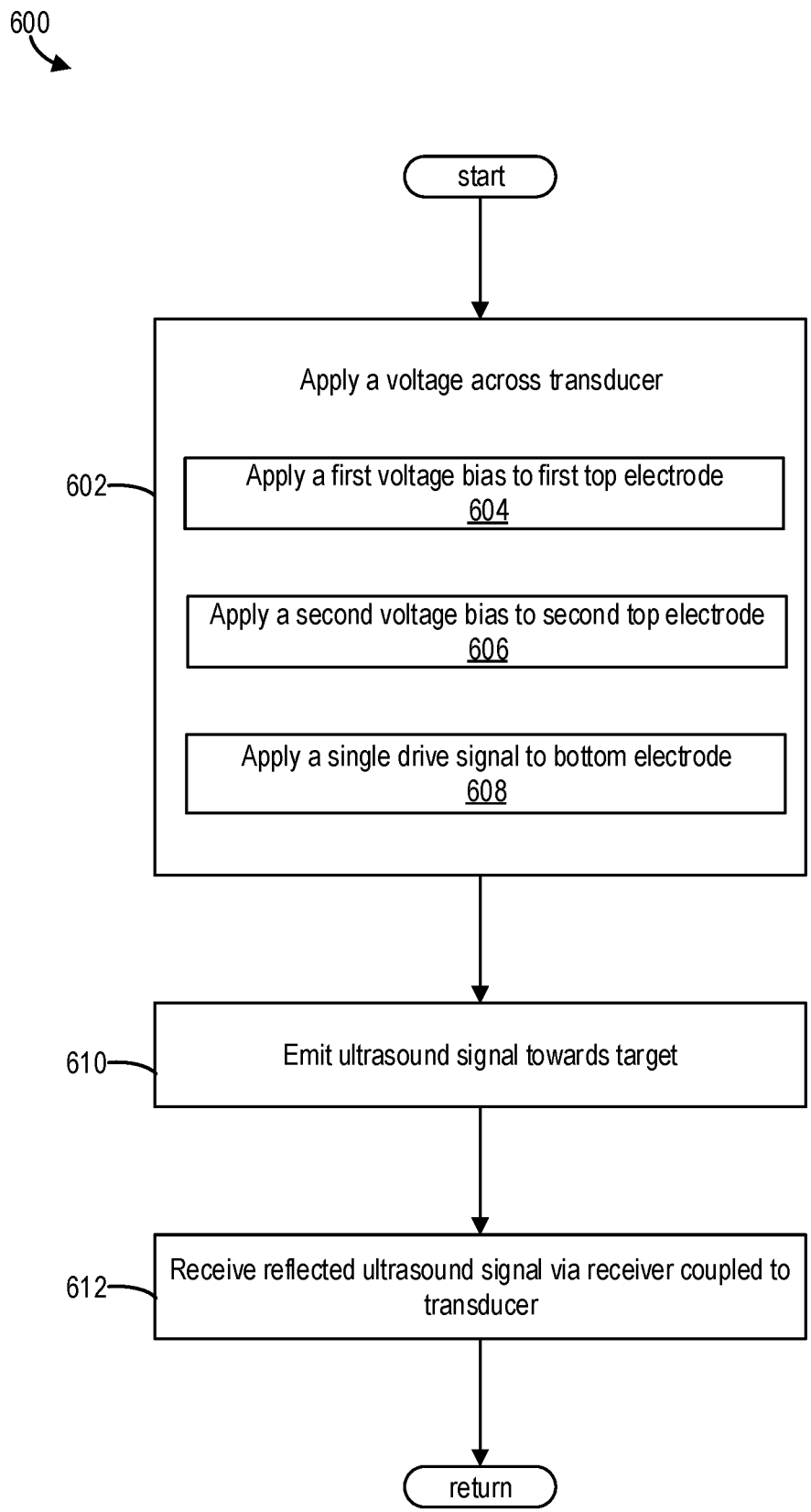
FIG. 6 shows a flowchart of an example of a method of using the drive circuit of FIG. 4, in accordance with various embodiments.

Illustrations of MUTs are shown in FIGS. 2A-2C. FIG. 2A shows an example of a cross section of a PMUT, FIG. 2B shows an example of a cross section of CMUT and FIG. 2C shows a top down view of a MUT that may be either a CMUT of a PMUT. MUTs like CMUTs and PMUTs may be more cost effective and more reliable than their non-micromachined, bulk counterparts. However, MUTs may vibrate at limited bandwidth when driven with a single drive signal. FIG. 3A shows an example of dual drive signals which may be used to drive a MUT, but which may not be practically implemented due to the number of transmitter and receiver components demanded to provide dual drive signals. FIG. 3B shows, in contrast, an exemplary embodiment of a single drive signal with dual bias voltages. The common drive signal shown in FIG. 3B may be applied to two different top electrodes via a bias circuit including two capacitors as shown schematically in FIG. 4. Driving the MUT using a common drive signal with dual bias voltages may result in an active layer of an MUT both compressing and expanding in response to an applied electric field. This effect is demonstrated with respect to a piezo layer in FIG. 5. FIG. 5 shows a graph of displacement of a piezo layer as a function of electric field. A flowchart of a method for operating an ultrasound probe illustrated schematically in FIG. 4 is shown in FIG. 6. When the ultrasound probe includes PMUTs, an effect of actuating the ultrasound probe with dual bias voltages may be to change a direction of polarization of a section of the piezo layer. This effect is illustrated schematically in FIG. 7 along with a graph showing changes in deflection as a result of the single drive signal applied at dual voltage biases.

Turning now to FIG. 1 a block diagram of an exemplary ultrasound system 100 that may be used in ultrasound imaging, in accordance with various embodiments is shown. The ultrasound system 100 comprises a transmitter 102, an ultrasound probe 104, a transmit beamformer 110, a receiver 118, a receive beamformer 120, A/D converters 122, an RF processor 124, an RF/IQ buffer 126, a user input device 130, a signal processor 132, an image buffer 136, a display system 134, and an archive 138. The circuit 111 is a non-limiting example of bias of an MUT and variations in a configuration of the circuit 111 are possible without departing from the scope of the present disclosure.

The transmitter 102 may comprise suitable logic, circuitry, interfaces and/or code that may be operable to drive the ultrasound probe 104. The ultrasound probe 104 may comprise, for example, a single element MUT, a 1D array of MUTs, 2D array of MUTs, an annular (ring) array of MUTs, etc. Accordingly, the ultrasound probe 104 may comprise a group of transducer elements 106 that may be, for example, MUTs. In certain embodiments, the ultrasound probe 104 may be operable to acquire ultrasound image data covering, for example, at least a substantial portion of an anatomy, such as the heart, a blood vessel, or any suitable anatomical structure. Each of the transducer elements 106 may be referred to as a channel.

The transmit beamformer 110 may comprise suitable logic, circuitry, interfaces and/or code that may be operable to control the transmitter 102 that drives the group of transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes can then be received by the transducer elements 106. For example, one or more drive circuits 111 may be coupled to and drive or control the electrodes of each transducer element 106. For example, the one or more drive circuits may be coupled to separate AC and DC voltage sources.

The group of transducer elements 106 in the ultrasound probe 104 may be operable to convert the received echoes into analog signals and communicated to a receiver 118. The receiver 118 may comprise suitable logic, circuitry, interfaces and/or code that may be operable to receive the signals from the ultrasound probe 104. The analog signals may be communicated to one or more of the plurality of A/D converters 122.

Accordingly, the ultrasound system 100 may multiplex such that ultrasonic transmit signals are transmitted during certain time periods and echoes of those ultrasonic signals are received during other time periods. Although not shown explicitly, various embodiments of the disclosure may allow simultaneous transmission of ultrasonic signals and reception of echoes from those signals. In such cases, the probe may comprise transmit transducer elements and receive transducer elements.

The plurality of A/D converters 122 may comprise suitable logic, circuitry, interfaces and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118.

The RF processor 124 may comprise suitable logic, circuitry, interfaces and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF data, which may be, for example, I/Q signal data, real valued RF data, etc., may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

Accordingly, various embodiments may have, for example, the RF processor 124 process real valued RF data, or any other equivalent representation of the data, with an appropriate RF/IQ buffer 126. The receive beamformer 120 may comprise suitable logic, circuitry, interfaces and/or code that may be operable to perform digital beamforming processing to sum, for example, delayed, phase shifted, and/or weighted channel signals received from the RF processor 124 via the RF/IQ buffer 126 and output a beam summed signal. The delayed, phase shifted, and/or weighted channel data may be summed to form a scan line output from the receive beamformer 120, where the scan line may be, for example, complex valued or non-complex valued. The specific delay for a channel may be provided, for example, by the RF processor 124 or any other processor configured to perform the task. The delayed, phase shifted, and/or weighted channel data may be referred to as delay aligned channel data.

The resulting processed information may be the beam summed signal that is output from the receive beamformer 120 and communicated to the signal processor 132. In accordance with some embodiments, the receiver 118, the plurality of A/D converters 122, the RF processor 124, and the beamformer 120 may be integrated into a single beamformer, which may be digital. In various embodiments, the ultrasound system 100 may comprise a plurality of receive beamformers 120.

The user input device 130 may be utilized to input patient data, scan parameters, settings, select protocols and/or templates, and the like. In an exemplary embodiment, the user input device 130 may be operable to configure, manage, and/or control operation of one or more components and/or modules in the ultrasound system 100. In this regard, the user input device 130 may be operable to configure, manage and/or control operation of the transmitter 102, the ultrasound probe 104, the transmit beamformer 110, the receiver 118, the receive beamformer 120, the RF processor 124, the RF/IQ buffer 126, the user input device 130, the signal processor 132, the image buffer 136, the display system 134, and/or the archive 138. The user input device 130 may include switch(es), button(s), rotary encoder(s), a touchscreen, motion tracking, voice recognition, a mouse device, keyboard, camera, and/or any other device capable of receiving a user directive. In certain embodiments, one or more of the user input devices 130 may be integrated into other components, such as the display system 134 or the ultrasound probe 104, for example. As an example, user input device 130 may comprise a touchscreen display.

The signal processor 132 may comprise suitable logic, circuitry, interfaces and/or code that may be operable to process ultrasound scan data (i.e., summed IQ signal) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 126 during a scanning session and processed in a live or off-line operation. In various embodiments, the processed image data can be presented at the display system 134 and/or stored at the archive 138. The archive 138 may be a local archive, a Picture Archiving and Communication System (PACS), or any suitable device for storing images and related information.

The signal processor 132 may comprise one or more central processing units, microprocessors, microcontrollers, and/or the like. The signal processor 132 may be an integrated component, or may be distributed across various locations, for example. In an exemplary embodiment, the signal processor 132 may be capable of receiving input information from the user input device 130 and/or the archive 138, generating an output displayable by the display system 134, and manipulating the output in response to input information from the user input device 130, among other things. The signal processor 132 may be capable of executing any of the method(s) and/or set(s) of instructions discussed herein in accordance with the various embodiments, for example.

The ultrasound system 100 may be operable to continuously acquire ultrasound scan data at a frame rate that is suitable for the imaging situation in question. Typical frame rates may range from 20-120 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several minutes worth of frames of ultrasound scan data. The frames of ultrasound scan data are stored in a manner to facilitate retrieval thereof according to its order or time of acquisition. The image buffer 136 may be embodied as any known data storage medium.

The display system 134 may be any device capable of communicating visual information to a user. For example, a display system 134 may include a liquid crystal display, a light emitting diode display, and/or any suitable display or displays. The display system 134 can be operable to present ultrasound images and/or any suitable information.

The archive 138 may be one or more computer-readable memories integrated with the ultrasound system 100 and/or communicatively coupled (e.g., over a network) to the ultrasound system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display. Additionally, while the ultrasound system 100 was described to comprise one receive beamformer 120, one RF processor 124, and one signal processor 132, various embodiments of the disclosure may use various number of processors. For example, various devices that execute code may be referred to generally as processors. Various embodiments may refer to each of these devices, including each of the RF processor 124 and the signal processor 132, as a processor. Furthermore, there may be other processors to additionally perform the tasks described as being performed by these devices, including the receive beamformer 120, the RF processor 124, and the signal processor 132, and all of these processors may be referred to as a "processor" for ease of description.

A transducer such as the transducer 106 of FIG. 1 may be a MUT such as a PMUT or a CMUT. MUTs may offer advantages over bulk ceramic transducers in terms of cost of fabrication, making ultrasounds systems using MUTs more affordable. Further, bulk ceramic transducers using lead zirconate titanate (PZT) as a piezoelectric material may pose environmental hazards due to the presence of lead. CMUTs do not include lead and an amount of lead in a PMUT is 0.5-1% the amount of lead in a bulk PZT transducer. However, adoption of MUTs may be hindered by limited bandwidth when compared to bulk ceramic transducers. Bandwidth of MUTs may be increased by providing two different drive signals. However, providing two different drive signals may demand that each transducer be coupled to two transmitters and two receivers, which may not be feasible, especially for matrix arrays which may include up to thousands of transducers. As described in greater detail herein, providing a single drive signal with dual bias voltages (e.g., with a first voltage bias and with a second voltage bias) may result in a higher bandwidth without demanding doubling of transceivers and receivers for each transducer.

Turning now to FIG. 2C, a top view of a MUT 280 is shown. MUT 280 may be transducer element of an ultrasound system, such as one of transducer elements 106 of FIG. 1. A reference axis 201 is provided for comparison of view shown in FIGS. 2A-2C. Reference axis includes a y-axis, an x-axis, and a z-axis. MUT 280 includes an active layer 282. In an example where MUT 280 is a CMUT, active layer 282 may be a membrane layer. An example where MUT 280 is a CMUT is discussed further with respect to FIG. 2B. In an alternate example, where MUT 280 is a PMUT, active layer 282 may be a piezo layer. An example where MUT 280 is a PMUT is discussed further with respect to FIG. 2A. Active layer 282 is shown as a square in FIG. 2C, however other shapes of active layer 282 have been considered.

MUT 280 may include a first top electrode 206 and a second top electrode 207. In some examples, first top electrode 206 may be shaped as a doughnut or a ring, where first top electrode 206 surrounds an empty space 286. However, other shapes of first top electrode 206 have been considered. In some examples a shape of first top electrode 206 may be selected based on a desired vibration of active layer 282. A first lead 284 may be continuously formed with first top electrode 206 and may extend from an outer edge of first top electrode 206 and an outer edge 281 of active layer 282.

A second top electrode 207 may be positioned inside empty space 286 delineated by first top electrode 206. In some examples, second top electrode 207 may be shaped as a circle. In alternate embodiments, second top electrode 207 may be shaped as a doughnut or a ring. Second top electrode is entirely spaced away from first top electrode 206. Both first top electrode 206 and second top electrode 207 are continuous. Alternate shapes and relative placements of second top electrode 207 have been considered. In some examples, a shape and/or placement of second top electrode 207 may be selected based on a desired vibration of active layer 282. A second lead 288 may be continuously formed with second top electrode 207 and may extend from second top electrode 207 to outer edge 281 of active layer 282. The doughnut of first top electrode 206 may be discontinuous where second lead 288 crosses first top electrode 206. In this way first top electrode 206 is not in direct contact with second top electrode 207.

In some examples, first lead 284 and second lead 288 each may be coupled to a distribution bus. The distribution bus may couple each transducer of a transducer array (e.g., transducer array 106) to a bias voltage network. The distribution bus may be configured to have minimal impedance. In this way unwanted phase shifts of a single drive signal across the transducer array may be reduced or eliminated. The distribution bus may exist on the MUT device or on an interconnect structure like a flexible circuit board, silicon interposer or printed electrical trace; other connection methods may be utilized.

A cross section A-A' of MUT 280 is shown in FIGS. 2B and 2C according to embodiments where MUT 280 is PMUT (FIG. 2A) and where MUT 280 is a CMUT (FIG. 2B). Turning now to FIG. 2A, a cross-sectional view of a PMUT 200 is shown. PMUT 200 may be an embodiment of MUT 280 shown in FIG. 2C. PMUT 200 may include a first side 204. First side 204 may be a side of PMUT 200 which is placed on or directed toward a target being imaged by the ultrasound sound probe which includes PMUT 200. A second side 202 of PMUT 200 may be the side opposite side 202 along the y-axis and distal from the subject. First side 204 may be the side shown in FIG. 2C.

PMUT 200 may include first top electrode 206 positioned as an outermost layer of PMUT 200. In some examples, first top electrode 206 may be shaped as a ring or doughnut. PMUT 200 may also include a second top electrode 207. First top electrode 206 and second top electrode 207 may together comprise a first, outermost layer when PMUT 200 is viewed from first side 204 looking towards second side 202. A side of first top electrode 206 and second top electrode 207 closest to second side 202 may be in face sharing contact with a piezo layer 208. Piezo layer 208 may be formed of a piezoelectric material such as PZT, AlN, ScAlN or the like. A side of piezo layer 208 closest to second side 202 may be in direct face sharing contact with bottom electrode 210. In this way, piezo layer 208 may be sandwiched between first top electrode 206/second top electrode 207 and bottom electrode 210. A side of bottom electrode 210 closest to second side 202 may be in direct face sharing contact with a first silicon layer 212. A side of first silicon layer 212 closest to second side 202 may be in direct face sharing contact with a silica ($SiO_2$) layer 214. A side of silica layer 214 closest to second side 202 may be in face sharing with second silicon layer 216. Second silicon layer 216 may be a last, outermost layer of PMUT 200 when viewed from first side 204 looking towards second side 202. Second silicon layer 216 and silica layer 214 may together enclose a microcavity 218. Microcavity 218 may be evacuated (e.g., under vacuum) or may include some amount of air or other gas.

PMUT 200 may be electrically coupled via first top electrode 206, second top electrode 207, and bottom electrode 210 to a drive circuit such as drive circuit 111 of FIG. 1. In a transmit mode, the drive circuit may supply a drive signal voltage between first top electrode 206 and bottom electrode 210 and between second top electrode 207 and bottom electrode 210, each of which may cause a certain vibration mode in piezo layer 208. The vibration of piezo layer 208 may in turn generate an acoustic wave towards an imaging target. In some examples, adjusting the drive signal voltage may result in adjusting the vibration mode. By simultaneously exciting two different vibration modes of piezo layer 208, a first acoustic wave characteristic of a first vibration mode and a second acoustic wave characteristic of the second vibration mode may be generated and emitted at the same time. In this way, a bandwidth of PMUT 200 may be increased.

Turning now to FIG. 2B it shows an exemplary embodiment of a CMUT 250. CMUT 250 may be an exemplary embodiment of MUT 280 shown in FIG. 2C. CMUT 250 includes first top electrode 206 and a second top electrode 207 as an outermost layer when looking at CMUT 250 from first side 204. A membrane layer 254 may be in face sharing contact and electrically coupled to first top electrode 206 and second top electrode 207. In some examples, membrane layer 254 may be formed of silicon or silicon oxide. An insulating layer 256 may be in face sharing contact with a bottom side (e.g., side closest to second side 202) of membrane layer 254. A bottom electrode 258 may be in face sharing contact with a bottom side of insulating layer 256. Insulating layer 256 may not completely cover the bottom side of membrane layer 254 and bottom electrode 258, thereby forming a microcavity 262 enclosed by membrane layer 254, insulating layer 256 and bottom electrode 258. Microcavity 262 may be evacuated or may include an amount of air. A bottom side of bottom electrode 258 may be a direct face sharing contact with a silicon substrate 260. Silicon substrate 260 may be an outermost layer when looking at CMUT 250 from second side 202.

CMUT 250 may be electrically coupled to a drive circuit such as drive circuit 111 of FIG. 1 via first top electrode 206 and bottom electrode 258, and via second top electrode 207 and bottom electrode 258. The drive circuit may supply a drive signal voltage between first top electrode 206 and bottom electrode 258 and between second top electrode 207 and bottom electrode 258, each of which may cause a characteristic vibration mode in membrane layer 254 according to a drive signal applied. Membrane layer 254 of CMUT 250 may behave similarly to piezo layer 208 of PMUT 200.

Turning now to FIG. 3A (prior art), a graph 300 shows of voltage across the MUT device (across the gap in cMUT or across the piezo layer in a pMUT) as a function of time for two drive signals for a MUT (e.g., MUT 280 of FIG. 2C) which, to be applied simultaneously to a single MUT, demands two transmitters and two receivers per MUT. Plot 302 corresponds to a first drive signal and plot 304 corresponds to a second drive signal. Both the first drive signal and the second drive signal may oscillate in a sinusoidal fashion between two voltages. First drive signal 302 may have a different shape like a modulated Gaussian shaped pulse (not shown). Then, the second drive signal would have a similarly shaped modulated Gaussian pulse of opposite phase. Both plot 302 and plot 304 oscillate between 0V and −20V, although other voltage ranges are possible, for example oscillating between +10V and −10V. The first drive signal may be out of phase with the second drive signal. Said another way, for any time period, plot 302 is increasing while plot 304 is decreasing or vice versa. Phasing drive signals in this way may result in two distinct vibrations of an active layer of a transducer (e.g., active layer 282 of FIG. 2C), resulting in an increase in the bandwidth of the MUT. However, providing two out of phase drive signals in this manner for an ultrasound probe including a plurality of transducers may demand an impractical number of transmitters and receivers. Alternatively, the first drive signal and the second drive signal may be provided by a radio frequency transformer coupled to a single transmitter/receiver. However, a radio frequency transformer may be demanded for each transducer of a transducer array and may not be a cost and space effective solution.

Turning now to FIG. 3B, a graph 350 is shown of an example voltage across a MUT device as a function of time for a single drive signal for the MUT such as MUT 280 of FIG. 2C. The single drive signal may demand a single transmitter and receiver per transducer element. Graph 350 includes plot 302, corresponding to the voltage across the device from a single drive signal and a first voltage bias. Graph 350 also includes plot 352, corresponding to the voltage across the device from a single drive signal and a second voltage bias. The single drive signal with the first voltage bias may cause the voltage across the device to oscillate between 0V and +20V. The single drive signal with the second voltage bias may cause the voltage across the device to oscillate in phase with the single drive signal at the first voltage bias and may be offset from the first bias. Said another way, for any given time period, plot 302 and plot 352 are either both increasing or both decreasing. In the example of graph 350, plot 352 is offset from plot 302 by 20V, however, other offsets have been considered. Additionally, a sine wave may be an example of an embodiment of the single drive signal, but other wave shapes of the single drive signal have been considered. The voltage offset between the drive signal with the first voltage bias and the drive signal with the second bias may polarize a piezoelectric layer (such as piezo layer 208 of FIG. 2A) in opposite directions. In this way, two active vibrations of the active layer are excited, similar to the result of the two out of phase drive signals shown in FIG. 3A. However, the single drive signal of FIG. 3B offset by dual voltage biases does not demand doubling of ultrasound transmitters and receivers.

Turning now to FIG. 4, a schematic diagram 400 is shown of a bias circuit 402 which may bias a single drive signal to dual bias voltages applied to electrodes of a transducer array 404. Transducer array 404 may include a first transducer 406 and a second transducer 408. Although two transducers are shown in schematic diagram 400, it is understood that a transducer array, according to an embodiment, may have N transducers. Additionally, the transducer array may be arranged as a linear array. 2D array, annular array, among others.

In one embodiment, first transducer 406 and second transducer 408 may each include a piezo layer and be configured as a PMUT such as PMUT 200 of FIG. 2A. In an alternate embodiment, first transducer 406 and second transducer 408 may each include a membrane and may be configured as a CMUT, such as CMUT 250 of FIG. 2B. In further examples, first transducer 406 may be configured as the PMUT while second transducer 408 is configured as a CMUT.

A first top electrode 410 and second top electrode 412 may be directly coupled to first transducer 406. A third top electrode 414 and fourth top electrode 416 may be directly coupled to second transducer 408. First top electrode 410 and third top electrode 414 may be the equivalent to first top electrode 206 of FIGS. 2A-2C. Second top electrode 412 and fourth top electrode 416 may be equivalent to second top electrode 207 of FIGS. 2A-2C. First top electrodes 410 and 414 are driven by the same bias voltage 422 and second top electrodes 412 and 416 are driven by the same bias 428.

A first bottom electrode 418 may be directly coupled to first transducer 406 and a second bottom electrode 420 may be directly coupled to second transducer 408. First bottom electrode 418 and second bottom electrode 420 may be equivalent to bottom electrode 210 of FIG. 2A and/or bottom electrode 258 of FIG. 2B.

Bias circuit 402 may be configured to bias the single drive signal with a first voltage bias applied to first transducer 406 via first top electrode 410 and to second transducer 408 via third top electrode 414. Further, bias circuit 402 may be configured to bias the single drive signal with a second voltage bias applied to first transducer 406 via second top electrode 412 and to transducer 408 via fourth top electrode 416.

First bottom electrode 418 may be electrically coupled to first transmitter/receiver 434 and second bottom electrode 420 may be coupled to second transmitter/receiver 436. In some examples, where the number N of transducers is large (e.g., ≥1000) providing cables to connect each transmitter/receiver to each transducer may be impractical. For this reason, the N transmitter/receivers (include first transmitter/receiver 434 and second transmitter/receiver 436) may be positioned physically close to the N transducer (e.g., within a handle of the ultrasound probe). First transmitter/receiver 434 may send a first single drive signal to first transducer 406 via first bottom electrode 418 and second transmitter/receiver 436 may send a second single drive signal to second transducer 408 via second bottom electrode 420. In some examples, the first single drive signal and the second single drive signal may be equivalent.

In an example where transducer array 404 includes N transducers, each bottom electrode of the N transducers may be coupled to a single transmitter/receiver. In some embodiments, the N transducer array may include no more than N transmitters and no more than N receivers. Each of the N transducers may demand a single transducer/receiver because a single drive signal is transmitted to each of the N transducers.

Bias circuit 402 may be coupled to top electrodes 411 of transducer array 404. First top electrode 410 and third top electrode 414 may each be electrically coupled to first voltage bias input 422. In examples where transducer array 404 includes N transducer elements, each of the N transducer element may also be coupled to first voltage bias input 422. First voltage bias input 422 may be coupled to a first resistor 426. A first capacitor 424 may be coupled to first voltage bias input 422 between first resistor 426 and the first top electrodes of the transducer array (e.g., first top electrode 410 and third top electrode 414). A side 425 of first capacitor 424 (e.g., the side not coupled to first voltage bias input 422) may be coupled to electrical ground or to an alternate electrical potential with low AC impedance.

Second top electrode 412 and fourth top electrode 416 may each be electrically coupled to second voltage bias input 428. In examples where transducer array 404 includes N transducer elements, each of the N transducer elements may also be coupled to second voltage bias input 428. Second voltage bias input 428 may be coupled to a second resistor 430. A second capacitor 432 may be coupled to second voltage bias input 428 between second resistor 430 and the second top electrodes of the transducer array (e.g., second top electrode 412 and fourth top electrode 416). A side 433 of second capacitor 432 may configured similarly to first capacitor 424 and may be coupled to electrical ground or to an alternate electrical potential with low AC impedance.

A dual voltage power source 442 may be coupled to first resistor 426 and second resistor 430. The dual voltage power source 442 may power bias circuit 402. Dual voltage power source 442 may output two separate voltages. One of the dual voltages may power first voltage bias input 422 while the other may power second voltage bias input 428. In a preferred embodiment, the bias voltages may be of opposite polarity and similar magnitude. In some implementations, one of the dual bias voltages may be close to zero while the other is on the order of several or tens of volts. The dual voltage power source 442 may be created from commercially available voltage regulators or voltage dividers.

The voltages applied across the active layers of first transducer 406 and second transducer 408 are the difference between the single drive signals supplied via first transmitter/receiver 434 or second transmitter/receiver 436 and the bias voltages supplied by first voltage bias input 422 and second voltage bias input 428. In some examples, the first voltage bias and the second voltage bias may be equal and oppositely signed. For example, the first voltage bias may be a positive voltage (e.g., +20V) and the second voltage bias may be a negative voltage (e.g., −20V). In alternate examples, the first voltage bias and the second voltage may be oppositely signed and unequal or one of the bias voltages may be zero. For examples where the first voltage bias or the second voltage bias is zero; the respective capacitor (e.g., first capacitor 424 for the first voltage bias or second capacitor 432 for the second voltage bas) and resistor (e.g., first resistor 426 for the first voltage bias or second resistor 430 for the second voltage bias) may be omitted. In an example where one or more of the transducers of the transducer array include the piezo layer, application of the first voltage bias or the second voltage bias may result in a voltage across the piezo layer that is greater than the coercive force of the piezo layer. In this way, a section of the piezo layer directly underneath a first set of top electrodes coupled to first voltage bias input 422 (e.g., first top electrode 410 and third top electrode 414) may have opposite polarity from a section of piezo layer directly underneath a second set of top electrodes coupled to second voltage bias input 428 (e.g., second top electrode 412 and fourth top electrode 416).

First capacitor 424 and second capacitor 432 may each be positioned physically close to the transducer array 404. In this way, a connection impedance between first capacitor 424 and first top electrode 410 and third top electrode 414 and a connection impedance between second capacitor 432 and second top electrode 412 and fourth top electrode 416 may be minimized. Both the first capacitor and a second capacitor may be configured with capacitances 1 to 20 times the combined transducer capacitances. First capacitor 424 and second capacitor 432 may each provide a low impedance path for the transmit and receive signals from first transmitter/receiver 434 and second transmitter/receiver 436. A low ground impedance assures low electrical crosstalk between first transducer 406 and second transducer 408.

First resistor 426 and second resistor 430 may be connected between the dual voltage power source 442 and the respective first voltage bias input 422 and second voltage bias input 428. In one example, the resistors are in a range of kOhms to 100's of kOhms. First resistor 426 and second resistor 430 may charge the first capacitor 424 and second capacitor 432, respectively, to a desired bias level. During operation of an ultrasound probe including bias circuit 402, first resistor 426 and second resistor 430 may experience little currents and little power dissipation. However, at power-up, the capacitor charge current may flow through first resistor 426 and second resistor 430. The capacitor charge current may cause a short but high power pulse and the first resistor 426 and second resistor 430 may be chosen to be able to withstand that pulse. In an alternate embodiment, the dual voltages from dual voltage power source 442 may be ramped up gradually.

Bias circuit 402 may rely on cost effective components such as capacitors and resistors. Additionally, a number for capacitors and resistors may depend on a number of voltage biases (e.g., dual voltage biases therefore two capacitors and two resistors) and not on N. For this reason, bias circuit 402 may be adapted to a large transducer array without increasing a cost or size of bias circuit 402. However, it may be desired to split first capacitor 424 and second capacitor 432 into a set of parallel connected capacitors which may be spatially distributed such that each of the N transducer elements may be physically close to a capacitor.

First transmitter/receiver 434 may include a first negative capacitance circuit 438 and second transmitter/receiver 436 may include a second negative capacitance circuit 440. First negative capacitance circuit 438 and second negative capacitance circuit 440 may be configured to reduce or eliminate a parasitic shunt capacitance of first transducer 406 and second transducer 408 respectively. If not accounted for, the parasitic shunt capacitance may cause power loss in first transmitter/receiver 434 and second transmitter/receiver 436, especially in examples where first transducer 406 and second transducer 408 are PMUTs. Additionally, shunt capacitance may cause acoustic reflections of transducer array 404. For this reason, the N transmitters/receivers may demand N negative capacitance circuits. By limiting a number of transmitters/receivers to be at most equivalent to a number of transducers, a number of negative capacitance circuits may also be limited. Limiting the number of transmitters/receivers and respective negative capacitance circuits may be desirable for minimizing a cost and complexity of the ultrasound system without sacrificing performance.

Turning now to FIG. 5, a graph 500 of displacement of a piezo layer as a function of applied electric field is shown. An electric field is applied to the piezo layer via a single top electrode and a single bottom electrode. Plot 502 corresponds to displacement of the piezo layer between a single top electrode and a single bottom electrode. Before applying the electric field, the piezo layer may be at point 504 corresponding to 0 applied voltage and 0 deflection. Moving along plot 502 from point 504 to point 506, an increasing positive electric field is applied. As the positive electric field increases, the piezo layer deflects by an increasing amount in a first direction corresponding to negative displacement along a y-axis of graph 500. As the electric field is increased from a first voltage at point 506 to a second voltage at point 508, the electric field increases past the material's positive coercive field, which causes the piezo layer to reverse polarization. Reversing polarization causes the piezo layer to deflect in a second direction, corresponding to positive deflection along the y-axis (e.g., between point 506 and point 508). Decreasing the electric field between 508 and point 510 causes the material to deflect in the first direction again. Continuing to decrease the electric field past point 510 in a negative direction along the x-axis may correspond to decreasing the electric field in a negative direction past the material's negative coercive field, which causes the piezo layer to reverse polarization. Reversing polarization causes the piezo layer to deflect in the second direction. Increasing electric field to less negative values between 510 and 512, causing the piezo layer to deflect in the first direction until reaching zero displacement at zero applied field at point 504.

Based on FIG. 5, the piezo material is in a first polarization between point 512 and 506 and in a second, reversed polarization between points 510 and 508. In an example where a piezo layer, such as piezo layer 208 of FIG. 2A is driven by a single drive signal on the bottom electrode and biased to a first voltage bias on the first top electrode and a second voltage bias on the second top electrode, the first voltage bias may maintain the piezo layer in the first polarization under a first top electrode and the second voltage bias may be oppositely signed and stronger than the coercive field to maintain the piezo layer in the second polarization under the second top electrode. In this way, when an increasing electric drive signal is applied, the piezo layer under the first top electrode may follow between points 512 and 506 and deflect in the first direction, and the piezo layer under the second top electrode may follow between points 510 and 508 and deflect in the second direction. The opposite deflection directions may correspond to two different vibration frequencies are driven simultaneously, thereby increasing a bandwidth of a transducer including the piezo layer. Alternatively, the opposite deflection directions may increase the transmit or receive sensitivity of the pMUT.

FIG. 6 shows an exemplary method of operating a probe of an ultrasound system, such as ultrasound system 100 of FIG. 1. Method 600 may be executed by a signal processor of an ultrasound system, such as signal processor 132 of ultrasound system 100 of FIG. 1. The ultrasound system may include a probe such as probe 104 of FIG. 1. In one embodiment, the probe may include a transducer. In further examples, the probe may include a transducer array comprised of N transducers. The transducer and/or N transducers may be MUTs such as PMUT 200 of FIG. 2A or CMUT 250 of FIG. 2B.

At 602, method 600 includes applying a voltage across a transducer. As shown in the exemplary embodiment of FIG. 4, the transducer element may be coupled, via a bottom electrode to a single transmitter.

Step 602 of method 600 further includes steps 604, 606, and 608. Steps 604, 606, and 608 may occur at the same time. At 604, method 600 includes applying a first voltage bias to a first top electrode of the transducer. For example, the first top electrode may be first top electrode 410 of FIG. 4 and/or first top electrode 206 of FIGS. 2A-2C. At 606, method 600 includes applying a second voltage bias to a second top electrode of the transducer. For example, the second top electrode may be second top electrode 412 of FIG. 4 or second top electrode 207 of FIGS. 2A-2C. At 608, method 600 includes applying a single drive signal to a bottom electrode of the transducer. The bottom electrode may be bottom electrode, for example, first bottom electrode 418 of FIG. 4, bottom electrode 210 of FIG. 2A, or bottom electrode 258 of FIG. 2B. The voltage applied across the transducer under the first top electrode may be in phase with a voltage applied across the electrode under the second top electrode The first voltage bias and the second voltage bias may be supplied by a bias circuit (such as bias circuit 402 of FIG. 4) electrically coupled to the first top electrode and the second top electrode. In some examples, the first voltage bias and the second voltage bias may be oppositely signed. For example, where the first voltage bias may be a first sign (e.g., positive), the second voltage bias may be a sign opposite the first sign (e.g., negative). In this way the single drive signal, in an example where the probe includes a transducer array of N transducers, may be applied to N transducers via at most, N transmitters and more than N transmitters are not demanded.

Additionally, in examples where the transducer is a PMUT and includes a piezo layer, step 602 may result in polarizing a piezo layer of the transducer in a first polarization under the first top electrode and simultaneously polarizing the piezo layer of the transducer in a second polarization opposite to the first polarization under the second top electrode. For this reason, the voltage applied across the transducer by under the first top electrode or the second top electrode may be greater than a coercive field of the piezo layer, and therefore reverses a polarity of the piezo layer. The piezo layer polarized in the first direction and the piezo layer polarized in the second direction may each respond differently to the applied voltage.

At 610, method 600 includes emitting an ultrasound signal from the transducer towards a target. The ultrasound signal may be a combination of a first active area (active area may correspond to a membrane of a CMUT or a piezo layer of a PMUT) of the MUTs under the first top electrode vibrating at a first frequency in response to the single drive signal applied at the first voltage bias and a second active area of the MUTs under the second top electrode vibrating at a second frequency in response to the single drive signal applied at the second voltage bias.

At 612, method 600 includes receiving a reflected ultrasound signal via a receiver coupled to the transducer. The received ultrasound signal may interact with the target before being reflected back to the transducer. In examples where the ultrasound probe includes the transducer array of N transducers, the received ultrasound signal, being generated by a single drive frequency, may demand at most N receivers, one coupled to each of the N transducers of the transducer array and more than N receivers are not demanded. Method 600 returns.

Figure 7:
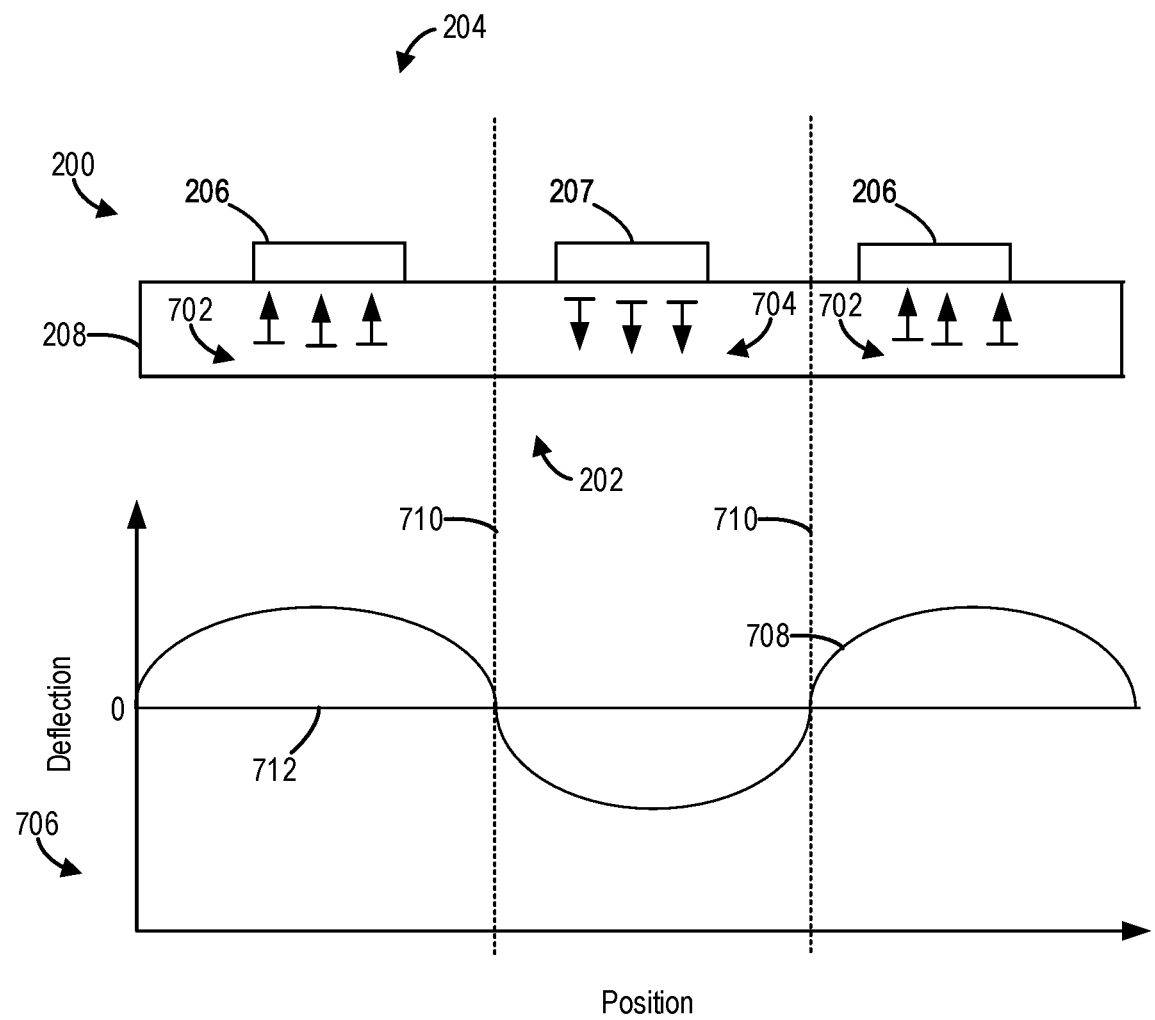
FIG. 7 shows a graph of displacement as a function of position across the cross section of the PMUT shown in FIG. 2A, in accordance with various embodiments.

The effect of oppositely polarized sections of a piezo layer is shown schematically in FIG. 7. A portion of the cross section illustration of PMUT 200 of FIG. 2A is reproduced including first top electrode 206, second top electrode 207 and piezo layer 208. First arrows 702 and second arrows 704 symbolically show a direction of polarization when the single drive signal is transmitted to the piezo layer. First arrows 702 show a polarization of a section of piezo layer 208 directly underneath first top electrode 206 pointing towards first side 204 of PMUT 200. Second arrows 704 show a polarization of a section of piezo layer 208 directly underneath second top electrode 207 pointing towards first side 204.

A graph 706 shows a deflection of the piezo layer as a function of position along a cross section of PMUT 200. The cross section may correspond to cross section of PMUT 200 shown above graph 706. Line 710 shows a position along the position axis and corresponding position on PMUT 200 across which the polarization of piezo layer 208 changes from the first polarization to the second polarization. Plot 708 corresponds to a predicted deflection amount of piezo layer 208 with respect to position. Line 712 corresponds to a neutral position where piezo layer 208 is not deflected. A positive deflection may correspond to flexing of piezo layer 208 towards first side 204 and a negative deflection may correspond to flexing of piezo layer 208 towards second side 202. Plot 708 may correspond to deflection measured as a result a single driving signal. As shown by plot 708, applying the single drive signal results in simultaneous deflection of piezo layer 208 in both the positive and negative directions.

The technical effect of method 600 is to transmit a single drive signal to a transducer of an ultrasound probe which results in vibrating an active layer of a MUT at two different frequencies simultaneously. A drive voltage with a first voltage bias may be applied across the MUT device at the same time as a drive voltage with a second voltage bias may be applied across the MUT device. A bottom electrode of the MUT may receive the single drive signal from the transmitter/receiver while the first voltage bias and the second voltage bias are applied to a first top electrode and a second top electrode by a bias circuit. In this way, the dual frequency vibrations are actuated using no more than N transmitters/receivers for an N transducer array and a cost and physical size an ultrasound system is not significantly increased. Additionally, the dual frequency vibrations are actuated using a single drive signal at a single phase. The bias circuit providing the first voltage bias and the second voltage bias may be cost effective and may be easily scaled to any N transducer array without increasing a number of circuit components.

The disclosure provides support for an ultrasound probe, comprising: a piezoelectric micromachined ultrasonic transducer (PMUT) including a first top electrode, a second top electrode, and a bottom electrode, a transmitter/receiver configured to apply a single drive signal to the bottom electrode, and a bias circuit configured to apply a first voltage bias to the first top electrode and to apply a second voltage bias to the second top electrode. In a first example of the system, a voltage across a piezo layer of the PMUT is a difference between the single drive signal and the first voltage bias under the first top electrode and a difference between the single drive signal and the second voltage bias under the second top electrode. In a second example of the system, optionally including the first example, the first voltage bias is a positive voltage and the second voltage bias is a negative voltage. In a third example of the system, optionally including one or both of the first and second examples, the PMUT includes a piezo layer in face sharing contact with the first top electrode and the second top electrode, and a voltage across the piezo layer under the first top electrode or under the second top electrode is greater than a coercive field of the piezo layer. In a fourth example of the system, optionally including one or more or each of the first through third examples, the ultrasound probe further comprises a plurality of PMUTs and the bias circuit is configured to apply the first voltage bias to each first top electrode and to apply the second voltage bias to each second top electrode of each of the plurality of PMUTs. In a fifth example of the system, optionally including one or more or each of the first through fourth examples, the PMUT is coupled to a single transmitter and to a single receiver.

The disclosure also provides support for a method of operating an ultrasound probe, comprising: applying a first voltage bias to a first top electrode of a transducer and applying a second voltage bias to a second top electrode of the transducer while applying a single drive signal to a bottom electrode of the transducer, emitting an ultrasound signal actuated by the transducer towards a target, and receiving a reflected ultrasound signal at no more a receiver coupled to the transducer. In a first example of the method, the transducer is a piezoelectric micromachined ultrasonic transducers (PMUTs) or capacitive micromachined ultrasonic transducers (CMUTs). In a second example of the method, optionally including the first example, a sign of the first voltage bias is opposite a sign of the second voltage bias. In a third example of the method, optionally including one or both of the first and second examples, a voltage applied across the transducer under the first top electrode is in phase with a voltage applied across the transducer under the second top electrode. In a fourth example of the method, optionally including one or more or each of the first through third examples, emitting the ultrasound signal includes vibrating the transducer at a first frequency and vibrating the transducer at a second frequency. In a fifth example of the method, optionally including one or more or each of the first through fourth examples, the transducer is a PMUT and a voltage applied across the transducer with the first voltage bias or the second voltage bias reverses a polarization of a section of a piezo layer of the PMUT.

The disclosure also provides support for an ultrasound probe, comprising: a transducer array including a transducer, a transmitter and a receiver coupled to a bottom electrode of the transducer, and a bias circuit coupled to a first top electrode and a second top electrode of each of the transducer, wherein the bias circuit is configured to apply a first voltage bias to the first top electrode and to apply a second voltage bias to the second top electrode. In a first example of the system, the bias circuit includes a first capacitor coupled to a first voltage bias input and a second capacitor coupled to a second voltage bias input. In a second example of the system, optionally including the first example, the first capacitor and the second capacitor are positioned as close as possible to the transducer. In a third example of the system, optionally including one or both of the first and second examples, the bias circuit includes a first resistor coupled to the first voltage bias input and a second resistor coupled to the second voltage bias input and the first capacitor is positioned between the first resistor and the first top electrode and the second capacitor is positioned between the second resistor and the second top electrode. In a fourth example of the system, optionally including one or more or each of the first through third examples, the transducer array includes N transducers and no more than N transmitters and no more than N receivers. In a fifth example of the system, optionally including one or more or each of the first through fourth examples, the receiver includes a negative capacitance circuit. In a sixth example of the system, optionally including one or more or each of the first through fifth examples, the first top electrode and the second top electrode are coupled to a distribution bus and the distribution bus is configured to have minimal impedance. In a seventh example of the system, optionally including one or more or each of the first through sixth examples, the bias circuit further include a power source.

In an another representation, a method of operating an ultrasound probe comprises transmitting a single drive signal biased with a first voltage bias and a second voltage bias to across a piezoelectric micromachined ultrasonic transducer (PMUT) of the ultrasound probe, wherein the single drive signal biased to one of the first voltage bias or the second voltage bias is greater than coercive field of a piezo layer of the PMUT. In a second example of the method, optionally including the first example, a section of the piezo layer under the first top electrode deflects in a first direction while a section of the piezo layer under the second top electrode simultaneously deflects in a second direction, the second direction opposite the first direction. In a third example of the method, optionally including one or both of the first and second examples, the method further comprises: emitting an ultrasound signal towards a target, wherein a section of the piezo layer under the first top electrode emits the ultrasound signal at a first frequency and a section of the piezo layer under the second top electrode emits the ultrasound signal at a second frequency. In a fourth example of the method, optionally including one or more or each of the first through third examples the ultrasound probe includes N transducers and transmitting the single drive signal includes transmitting the single drive signal using N transmitters coupled to a bottom electrode of the N transducers. In a fifth example of the method, optionally including one or more or each of the first through fourth examples, the method further comprises: receiving a reflected ultrasound signal via N receivers coupled to N transducers.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

FIGS. 2A, 2B, and 2C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An ultrasound probe, comprising:
   a piezoelectric micromachined ultrasonic transducer (PMUT) including a first top electrode, a second top electrode, and a bottom electrode;
   a transmitter/receiver configured to apply a single drive signal to the bottom electrode; and
   a bias circuit configured to apply a first voltage bias to the first top electrode and to apply a second voltage bias to the second top electrode, wherein the single drive signal and the applied second voltage bias cause a voltage across the PMUT to oscillate in phase with and offset relative a voltage across the PMUT from the single drive signal and the applied first bias voltage.

2. The ultrasound probe of claim 1, wherein a voltage across a piezo layer of the PMUT is a difference between the single drive signal and the first voltage bias under the first top electrode and another voltage is a difference between the single drive signal and the second voltage bias under the second top electrode.

3. The ultrasound probe of claim 1, wherein the first voltage bias is a positive voltage and the second voltage bias is a negative voltage.

4. The ultrasound probe of claim 1, wherein the PMUT includes a piezo layer in face sharing contact with the first top electrode and the second top electrode, and a voltage across the piezo layer under the first top electrode or under the second top electrode is greater than a coercive field of the piezo layer.

5. The ultrasound probe of claim 1, wherein the ultrasound probe further comprises a plurality of PMUTs and the bias circuit is configured to apply the first voltage bias to each first top electrode and to apply the second voltage bias to each second top electrode of each of the plurality of PMUTs.

6. The ultrasound probe of claim 1, wherein the bottom electrode of the PMUT is coupled to a single transmitter and to a single receiver and each of the first top electrode and the second top electrode is coupled to a single power source.

7. A method of operating an ultrasound probe, comprising:
applying a first voltage bias to a first top electrode of a piezoelectric micromachined ultrasonic transducer (PMUT) and applying a second voltage bias to a second top electrode of the transducer while applying a single drive signal to a bottom electrode of the transducer, causing a voltage across the PMUT from the applied first voltage bias to oscillate in phase with and offset from a voltage across the PMUT from the applied second voltage bias;
emitting an ultrasound signal actuated by the transducer towards a target; and
receiving a reflected ultrasound signal at a receiver coupled to the transducer.

8. The method of claim 7, wherein a sign of the first voltage bias is opposite a sign of the second voltage bias.

9. The method of claim 7, wherein emitting the ultrasound signal includes vibrating the transducer at a first frequency and vibrating the transducer at a second frequency.

10. The method of claim 7, wherein the voltage applied across the transducer with the first voltage bias reverses a polarization of a section of a piezo layer of the PMUT under the first top electrode at the same time as the second voltage bias polarizes a section of the piezo layer of the PMUT under the second top electrode in a direction opposite the polarization under the first top electrode.

11. An ultrasound probe, comprising:
a transducer array including a piezoelectric micromachined ultrasonic transducer (PMUT);
a transmitter and a receiver coupled to a bottom electrode of the transducer, wherein the transmitter is configured to apply a single drive signal; and
a bias circuit coupled to a first top electrode and a second top electrode of the transducer, wherein the bias circuit is configured to apply a first voltage bias to the first top electrode and to apply a second voltage bias to the second top electrode, and wherein the single drive signal and the applied second voltage bias cause a voltage across the PMUT to oscillate in phase with and offset relative a voltage across the PMUT from the single drive signal and the applied first bias voltage.

12. The ultrasound probe of claim 11, wherein the bias circuit includes a first capacitor coupled to a first voltage bias input and a second capacitor coupled to a second voltage bias input.

13. The ultrasound probe of claim 12, wherein the first capacitor and the second capacitor have capacitances 1 to 20 times the combined transducer capacitances.

14. The ultrasound probe of claim 12, wherein the bias circuit includes a first resistor coupled to the first voltage bias input and a second resistor coupled to the second voltage bias input and the first capacitor is positioned between the first resistor and the first top electrode and the second capacitor is positioned between the second resistor and the second top electrode.

15. The ultrasound probe of claim 11, wherein the transducer array includes N transducers.

16. The ultrasound probe of claim 11, wherein the receiver includes a negative capacitance circuit.

17. The ultrasound probe of claim 11, wherein the first top electrode and the second top electrode are coupled to a distribution bus.

18. The ultrasound probe of claim 11, wherein the bias circuit further includes a dual voltage power source.

* * * * *